US00RE38589E1

(19) United States
(12) Reissued Patent
Hiraoka et al.

(10) Patent Number: US RE38,589 E
(45) Date of Reissued Patent: Sep. 14, 2004

(54) THREE-PIECE SOLID GOLF BALL

(75) Inventors: Hidenori Hiraoka, Hyogo-ken (JP); Yoshimasa Koizumi, Kobe (JP)

(73) Assignee: Sumitomo Rubber Industries, Ltd., Hyogo-ken (JP)

(21) Appl. No.: 09/248,118

(22) Filed: Feb. 11, 1999

Related U.S. Patent Documents

Reissue of:
(64) Patent No.: 5,601,502
Issued: Feb. 11, 1997
Appl. No.: 08/365,110
Filed: Dec. 28, 1994

(30) Foreign Application Priority Data

Dec. 28, 1993 (JP) ..... 5-353231

(51) Int. Cl.[7] ..... A63B 37/06
(52) U.S. Cl. ..... 473/373
(58) Field of Search ..... 473/371, 373, 473/374

(56) References Cited

U.S. PATENT DOCUMENTS 4,848,770 A * 7/1989 Shama ..... 473/374 X
5,002,281 A * 3/1991 Nakahara et al. ..... 473/374 X
5,072,944 A * 12/1991 Nakahara et al. ..... 473/373
5,601,502 A * 2/1997 Hiraoka et al. ..... 473/373

FOREIGN PATENT DOCUMENTS

GB 2228874 * 9/1990
GB 22322162 * 12/1990

* cited by examiner

*Primary Examiner*—Steven Wong
(74) *Attorney, Agent, or Firm*—Birch, Stewart, Kolasch & Birch, LLP.

(57) ABSTRACT

The present invention provides a three-piece solid golf ball having both excellent hit feeling and large flying distance. The three-piece solid golf ball comprises a core 1 and a cover 2 covering the core 1, and the core 1 has a two-layer structure comprising a center 1a and an outer shell 1b. The center 1a contains an α,β-unsaturated carboxylic acid metallic salt in an amount of 13 to 28 parts by weight based on 100 parts by weight of a base rubber and the outer shell 1b contains an α,β-unsaturated carboxylic acid metallic salt in an amount of 28 to 35 parts by weight based on 100 parts by weight of an base rubber. A surface hardness (measured by JIS-C type hardness tester) of the core 1 is 75 to 88 and a compression deformation amount of the core 1 is 2.7 to 5.0 mm.

14 Claims, 1 Drawing Sheet

THREE-PIECE SOLID GOLF BALL

Matter enclosed in heavy brackets [ ] appears in the original patent but forms no part of this reissue specification; matter printed in italics indicates the additions made by reissue.

FIELD OF THE INVENTION

The present invention relates to a three-piece solid golf ball comprising a core and a cover covering the core, wherein the core has, a two-layer structure composed of a center and an outer shell.

BACKGROUND OF THE INVENTION

Among golf balls which are commercially available at present, a golf ball having a one- or two-layer structure which is referred to as a "solid golf ball" has excellent, large, flying distance properties but the disadvantage that the hit feeling is hard.

Therefore, a golf ball having an excellent hit feeling has heretofore been achieved by softening the hardness of the whole golf ball (i.e. decreasing the ball compression).

However, when the whole golf ball is softened, the flying distance is reduced and, therefore, it is impossible to satisfy a golfer's request to increase the flying distance and at the same time obtain a good hit feeling.

Thus, as described above, a conventional solid golf ball has the problem that a golf ball attaining a large flying distance is inferior in hit feeling and alternatively, the flying distance deteriorates if the hit feeling is improved.

OBJECTS OF THE INVENTION

The main object of the present invention is to provide a solid golf ball having both excellent hit feeling and large flying distance.

This object as well as other objects and advantages of the present invention will become apparent to those skilled in the art from the following description with reference to the accompanying drawing.

SUMMARY OF THE INVENTION

Figure 1:
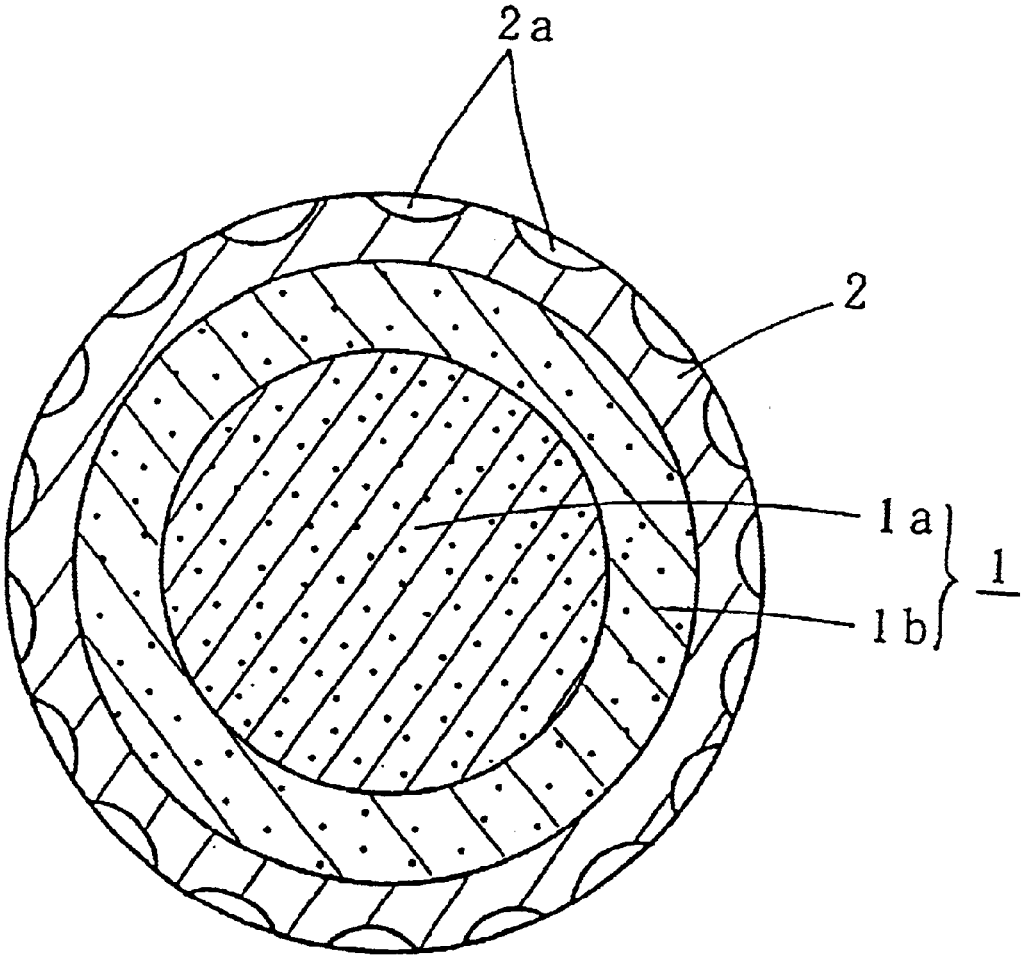
FIG. 1 is a schematic cross section illustrating one embodiment of the three-piece solid golf ball of the present invention.

The present invention provides a three-piece solid golf ball comprising a core 1 and a cover covering said core 1, said core 1 having a two-layer structure composed of a center 1a and an outer shell 1b, wherein the center 1a is prepared from an α,β-unsaturated carboxylic acid metallic salt in an amount of 13 to 28 parts by weight based on 100 parts by weight of a base rubber and the outer shell 1b is prepared from an α,β-unsaturated carboxylic acid metallic salt in an amount of 28 to 35 parts by weight based on 100 parts by weight of a base rubber and wherein a surface hardness (measured by JIS-C type hardness tester) of the core 1 is 75 to 88 and a compression deformation amount of the core 1 is 2.7 to 5.0 mm.

The present invention has accomplished the above object by constituting a core with a two-layer structure comprising a center and an outer shell, separating a formulation distribution of a crosslinking agent in the core into the center and outer shell, decreasing the amount of the crosslinking agent to be formulated into the center and increasing the amount of the crosslinking agent to be formulated in the outer shell.

That is, in the present invention, the amount of the rubber content is increased by decreasing the amount of the crosslinking agent to be formulated into the center to prepare the soft center having a high impact resilience. Further, the outer shell which is harder than the center is prepared by increasing the amount of the crosslinking agent in comparison with that formulated in the center, thereby affording a golf ball having both good hit feeling and large flying distance.

DETAILED DESCRIPTION OF THE INVENTION

Hereinafter, the present invention will be explained in detail.

Firstly, the construction of the three-piece golf ball of the present invention will be explained with reference to the accompanying drawing.

FIG. 1 is a schematic cross section illustrating one embodiment of the three-piece golf ball of the present invention. In FIG. 1, 1 is a core and 2 is a cover. The core 1 has a two-layer structure comprising a center 1a and an outer shell 1b which is formed to coat the outer periphery side of the center 1a. The core 1 having a two-layer structure is covered by a cover 2.

As the base rubber used for the core 1, there can be used butadiene rubber, preferably butadiene rubber containing a cis-1,4 structure of 40% or more, particularly 85% or more. Further, if necessary, natural rubber, isoprene rubber, styrene-butadiene rubber, etc. may be formulated in this butadiene rubber.

As the crosslinking agent, there can be used an α,β-unsaturated carboxylic acid metallic salt. Preferred examples of the α,β-unsaturated carboxylic acid metallic salt include metallic salts such as zinc salt, magnesium salt, etc. of α,β-unsaturated carboxylic acids such as acrylic acid, methacrylic acid, etc. Among them, zinc acrylate and zinc methacrylate are particularly preferred. Further, the α,β-unsaturated carboxylic acid metallic salt may be formed in a rubber composition by formulating α,β-unsaturated carboxylic acids such as acrylic acid, methacrylic acid, etc. and metallic compounds such as zinc oxide, magnesium oxide, etc. when the rubber composition is prepared.

The amount of the α,β-unsaturated carboxylic acid metallic salt to be formulated in the center 1a is preferably 13 to 28 parts by weight, particularly 15 to 25 parts by weight, based on 100 parts by weight of the base rubber.

When the amount of the α,β-unsaturated carboxylic acid metallic salt to be formulated in the center 1a is smaller than the above range, the resulting rubber composition is too soft and it is difficult to mold a core. Further, the durability of the golf ball is drastically deteriorated. On the other hand, when the amount of the α,β-unsaturated carboxylic acid metallic salt to be formulated in the center 1a is larger than the above range, the core becomes too hard and the ball compression becomes high, which results in deterioration of the hit feeling. Further, deterioration of the rubber content causes deterioration of the rubber elasticity of the center 1a, which results in deterioration of the flying distance of the golf ball.

The amount of the α,β-unsaturated carboxylic acid metallic salt to be formulated in the outer shell 1b is preferably 28 to 35 parts by weight, particularly 28 to 34 parts by weight, based on 100 parts by weight of the base rubber.

When the amount of the α,β-carboxylic acid metallic salt to be formulated in the outer shell 1b is smaller than the above range, a heavy feeling is obtained at the time of hitting because the outer shell 1b is soft and, therefore, the hit feeling is inferior. On the other hand, when the amount of the α,β-unsaturated carboxylic acid metallic salt to be formulated in the outer shell 1b is larger than the above range, the outer shell 1b becomes too hard and the hit feeling becomes inferior.

In the rubber composition for center 1a and outer shell 1b, fillers, crosslinking initiators, etc. are normally added to the rubber base, in addition to the above α,β-unsaturated carboxylic acid metallic salt. If appropriate, antioxidants, crosslinking regulators, softeners, etc. may be suitably added.

As the filler, for example, inorganic fillers such as zinc oxide, barium sulfate, calcium carbonate, barium carbonate, clay, etc. are mainly used. Examples of the crosslinking initiator include organic peroxides such as dicumyl peroxide, 1,1-bis(tertbutylperoxy) 3,3,5-trimethylcyclohexane and the like. Among them, dicumyl peroxide is particularly preferred.

In case of center 1a, the amount of the filler and crosslinking initiator is preferably 4 to 136 parts by weight and 0.5 to 3 parts by weight, respectively, based on 100 parts by weight of the base rubber. In case of outer shell 1b, the amount of the filler and crosslinking initiator is preferably 1 to 106 parts by weight and 0.5 to 3 parts by weight, respectively, based on 100 parts by weight of the base rubber.

The preparation of the rubber composition for center 1a and outer shell 1b is conducted by kneading the base rubber and various formulation components, using roll, kneader, Banbury, etc. Then, the rubber composition obtained after kneading is cut into a compound having a suitable size, which is molded into a center 1a or an outer shell 1b by press molding or injection molding.

The molding of the center 1a is conducted by heating at 140° to 180° C. for 10 to 40 minutes, in case of press molding. In case of injection molding, it is conducted by heating at a die temperature of 135° to 165° C. for 10 to 20 minutes.

In case of press molding, the molding of the outer shell 1b is conducted by heating at 150° to 190° C. for 10 to 80 minutes. In case of injection molding, there can be used a method comprising preparing a couple of half-shells by a simple boarding, placing a center 1a in the half-shells and subjected to a press molding to prepare a core 1 and a method comprising preparing a couple of semi-vulcanized half-shells in advance by an injection molding, placing a center 1a in the half-shells and subjected to a press molding to prepare a core 1.

The diameter of the center 1a is preferably 22 to 32 mm. When the diameter of the center 1a is smaller than 22 mm, it is not effective to improve the impact resilience. On the other hand, when the diameter is larger than 32 mm, the core 1 is too soft and the durability of the golf ball is liable to be extremely deteriorated. The thickness of the outer shell 1b varies depending on the diameter of the center 1a, but is preferably 2 to 10 mm.

It is necessary that the surface hardness (measured by JIS-C type hardness tester) and the compression deformation amount of the core 1 are 75 to 88 and 2.7 to 5.0 mm, respectively. That is, when the surface hardness of the core 1 is smaller than the above range, a heavy feeling is obtained at the time of hitting and the hit feeling is inferior. Further, the durability is also deteriorated. On the other hand, when the surface hardness of the core 1 is larger than the above range, the golf ball becomes hard and the hit feeling becomes inferior. Further, when the compression deformation amount of the core 1 is smaller than the above range, the golf ball becomes hard and the hit feeling is inferior. On the other hand, when the compression deformation amount of the core 1 is larger than the above range, a heavy feeling is obtained at the time of hitting and the hit feeling is inferior. Further, the durability is also deteriorated.

A golf ball is prepared by covering a cover 2 on the core 1 having a two-layer structure thus prepared as described above.

As the material for cover 2, various materials can be used. For example, there can be used those which contain ionomer as a main material, or those which obtained by adding pigments (e.g. titanium dioxide, barium sulfate, etc.) and, if appropriate, antioxidants to a synthetic resin as a main material, said synthetic resin being obtained by adding polyamide, polyester resin, polyurethane, polyethylene resin to ionomer.

The molding of the cover 2 is conducted by a method comprising molding the above composition for cover into a semi-spherical half-shell in advance, covering the core 1 with two half-shells and subjected to a pressure molding at 130° to 170° C. for 1 to 15 minutes, or a method comprising subjecting the composition for cover to an injection molding directly to the circumference of the core 1 to cover the core 1.

The thickness of the cover 2 is normally about 1 to 4 mm. When the cover 2 is molded, dimples are formed on the surface of the golf ball, if necessary. After the cover 2 was molded, the golf ball is provided with a painting and stamping, if necessary.

Hereinafter, the construction of the three-piece solid golf ball of the present invention will be explained with reference to FIG. 1, again. As described above, 1 is a core and the core 1 has a two-layer structure comprising a center 1a and an outer shell 1b. The center 1a is composed of a crosslinked molded product of a rubber composition containing an α,β-unsaturated carboxylic acid metallic salt in an amount of 13 to 28 parts by weight based on 100 parts by weight of a base rubber and the outer shell 1b is composed of a crosslinked molded product containing an α,β-unsaturated carboxylic acid metallic salt in an amount of 28 to 35 parts by weight based on 100 parts by weight of the base rubber. The core 1 having a two-layer structure comprising the center 1a and the outer shell 1b is covered with a cover 2.

The core 1 thus prepared has a surface hardness (measured by JIS-C type hardness tester) of 75 to 88 and a compression deformation amount of 2.7 to 5.0 mm. Further, dimples 2a are suitably provided on the outer periphery part of the cover 2.

As described above, the three-piece solid golf ball of the present invention attains a large flying distance and is superior in hit feeling.

EXAMPLES

The following Examples and Comparative Examples further illustrate the present invention in detail but are not to be construed to limit the scope thereof.

Examples 1 to 2 and Comparative Examples 1 to 5

According to the formulation shown in Tables 1, and 2, a rubber composition for center and a rubber composition for outer shell were prepared by sufficiently mixing the formulation. In Table 1, the formulation components of Examples 1 to 2 and Comparative Examples 1 to 2 are shown. In Table 2, the formulation components of Comparative Examples 3 to 5 are shown. Further, the amount of each formulation component in Tables 1 and 2 is by weight unless otherwise stated.

The molding of the center was conducted by charging the above rubber composition for center in a die and subjected to a press molding. The molding condition is shown in Tables 1 and 2, respectively. The setting diameter of the center is 27 mm in Examples 1 to 2 and Comparative Examples 1 to 4. Since the golf ball of the Comparative Example 5 is a two-piece sold golf ball of which core has a one-layer structure, the diameter of the center is larger than that of the above golf balls and is 38.4 mm.

The molding of the outer shell was conducted by preparing a couple of semi-vulcanized half-shells with the above rubber composition for outer shell, placing the above center in the half-sells and subjected to a press molding in a die under the molding condition shown in Tables 1 and 2. Then, a diameter of a core having a two-layer structure thus prepared was 38.4 mm.

TABLE 1

| | Example 1 | Example 2 | Comparative Example 1 | Comparative Example 2 |
|---|---|---|---|---|
| Formulation of center | | | | |
| Butadiene rubber ※1 | 100 | 100 | 100 | 100 |
| Zinc acrylate | 20 | 25 | 30 | 25 |
| Zinc oxide | 24.7 | 23.0 | 21.2 | 23.0 |
| Antiooxidant ※2 | 0.5 | 0.5 | 0.5 | 0.5 |
| Dicumyl peroxide | 1.0 | 1.0 | 1.0 | 1.0 |
| Molding condition of center (° C. × minutes) | 150 × 30 | 145 × 30 | 150 × 30 | 150 × 30 |
| Formulation of outer shell | | | | |
| Butadiene rubber | 100 | 100 | 100 | 100 |
| Zinc acrylate | 31 | 33 | 30 | 25 |
| Zinc oxide | 20.8 | 20.2 | 21.2 | 23.0 |
| Antioxidant | 0.5 | 0.5 | 0.5 | 0.5 |
| Dicumyl peroxide | 2.0 | 2.0 | 2.0 | 2.0 |
| Molding condition of outer shell (° C. × minutes) | 175 × 20 | 175 × 20 | 175 × 20 | 180 × 20 |

※1: JSR BR11 (trade name), manufactured by Nippon Synthetic Rubber Co., Ltd.
※2: Naldene N5-6 (trade name), manufactured by Otachi Shinko Kagano Kogyo, Ltd.

TABLE 2

| | Comparative Example 3 | Comparative Example 4 | Comparative Example 5 |
|---|---|---|---|
| Formulation of center | | | |
| Butadiene rubber | 100 | 100 | 100 |
| Zinc acrylate | 33 | 25 | 30 |
| Zinc oxide | 20.2 | 23.0 | 2.0 |
| Antioxidant | 0.5 | 0.5 | 0.5 |
| Dicumyl peroxide | 2.0 | 1.0 | 2.0 |
| Molding condition of center (° C. × minutes) | 150 × 25 | 145 × 30 | 155 × 25 |
| Formulation of outer shell | | | |
| Butadiene rubber | 100 | 100 | — |
| Zinc acrylate | 20 | 37 | — |

TABLE 2-continued

| | Comparative Example 3 | Comparative Example 4 | Comparative Example 5 |
|---|---|---|---|
| Zinc oxide | 24.7 | 19.5 | — |
| Antioxidant | 0.5 | 0.5 | — |
| Dicumyl peroxide | 1.0 | 2.0 | — |
| Molding condition of outer shell (° C. × minutes) | 180 × 20 | 175 × 20 | — |

The surface hardness and the compression deformation amount of the resulting core were measured. The results are shown in Tables 3 and 4.

Further, a composition for cover obtained by adding 2 parts by weight of titanium dioxide to 100 parts by weight of ionomer was coated on each core thus obtained as described above by injection molding to prepare a three-piece solid golf ball. A paint was coated on this golf ball to prepare a coated golf ball having an outer diameter of 42.7 mm.

The ball weight, the ball compression and the flying distance of the resulting golf ball were measured. The results are shown in Tables 3 and 4. Further, the hit feeling was examined by hitting the resulting golf ball, actually. The results are also shown in Tables 3 and 4.

The measuring method of the surface hardness and the compression deformation amount of the core as well as the measuring method of the ball compression, the flying distance and the hit feeling of the golf ball are as follows.

Surface hardness of core:

It is measured using a JIS-C type harness tester.

Compression deformation amount of core:

An initial load (30 kg[/cm$^2$]) is applied on the core, and then a final load (130 kg[/cm$^2$]) is applied. The amount of deformation (mm) formed between *the* initial loading and *the* final loading is measured.

Ball compression:

It is measured according to USGA system.

Flying distance:

A swing robot manufactured by True Temper Co. was equipped with a No. 1 wood club and a golf ball is hit at a head speed of 45 m/second to measure a distance (yard) of the golf ball from the point where the golf ball was dropped.

Hit feeling:

A total of ten golfers of three professional golfers and seven amateur golfers who are given a handicap of 10 or less actually hit the golf ball with a No. 1 wood club and the hit feeling is evaluated. The results shown in Tables 3 and 4 are based on the fact that not less than 8 out of 10 golfers evaluated with the same criterion.

TABLE 3

| | Example 1 | Example 2 | Comparative Example 1 | Comparative Example 2 |
|---|---|---|---|---|
| Physical properties of core | | | | |
| Surface hardness (JIS-C) | 76 | 78 | 77 | 73 |
| Compression deformation amount (nm) | 4.2 | 3.0 | 2.6 | 3.0 |

TABLE 3-continued

| | Example 1 | Example 2 | Comparative Example 1 | Comparative Example 2 |
|---|---|---|---|---|
| Physical properties of ball | | | | |
| Weight (g) | 45.2 | 45.3 | 45.2 | 45.2 |
| Ball compression | 80 | 102 | 115 | 103 |
| Flying distance (yard) | 230 | 231 | 228 | 220 |
| Hit feeling | Good | Good | Hard | Average |

TABLE 4

| | Comparative Example 3 | Comparative Example 4 | Comparative Example 5 |
|---|---|---|---|
| Physical properties of core | | | |
| Surface hardness (JIS-C) | 71 | 92 | 77 |
| Compression deformation amount (nm) | 2.2 | 2.5 | 3.0 |
| Physical properties of ball | | | |
| Weight (g) | 45.1 | 41.3 | 45.3 |
| Ball compression | 121 | 119 | 102 |
| Flying distance (yard) | 228 | 227 | 225 |
| Hit feeling | Hard | Hard | Hard |

As is apparent from the results shown in Tables 3 and 4, the golf balls of Examples 1 to 2 attained a large flying distance in comparison with the golf ball of Comparative Example 5 which corresponds to a conventional two-piece solid golf ball, and were superior in hit feeling.

To the contrary, the golf ball of Comparative Example 1 wherein the amount of zinc acrylate to be formulated in the center is larger than that of the present invention (15 to 28 parts by weight based on 100 parts by weight of the base rubber) attained considerably large flying distance but the hit feeling was hard. Further, regarding the golf ball of Comparative Example 2 wherein the amount of zinc acrylate to be formulated in the outer shell is smaller than that of the present invention (28 to 35 parts by weight based on 100 parts by weight of the base rubber), the hit feeling was not inferior but the flying distance was small.

Further, regarding the golf ball of Comparative Example 3 wherein the amount of zinc acrylate to be formulated in the center is increased in comparison with that of Comparative Example 1 and the amount of zinc acrylate to be formulated in the outer shell is decreased in comparison with that of Comparative Example 2, the flying distance was considerably increased but the hit feeling was hard. Further regarding the golf ball of Comparative Example 4 wherein the amount of zinc acrylate to be formulated in the center is suitable but the amount of zinc acrylate to be formulated in the outer shell is larger than that of Comparative Example 1, the flying distance is liable to be decreased and the hit feeding is hard, and it was not preferred.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A three-piece solid golf ball comprising a core 1 and a cover covering said core 1, said core 1 having a two-layer structure composed of a center 1a and an outer shell 1b, wherein the center 1a is prepared from an α,β-unsaturated carboxylic acid metallic salt in an amount of [13] *20* to 28 parts by weight based on 100 parts by weight of a base rubber and the outer shell 1b is prepared from an α,β-unsaturated carboxylic acid metallic salt in an amount of 28 to [35] *33* parts by weight based on 100 parts by weight of a base rubber and wherein a surface hardness (measured by JIS-C type hardness tester) of the core 1 is 75 to 88 [and a compression deformation amount of the core 1 is 2.7 to 5.0 mm].

2. The three-piece solid golf ball according to claim 1, wherein a diameter of the center 1a is 22 to 32 mm.

3. The three-piece solid golf ball according to claim 1 wherein said center 1a is formed by molding a rubber composition which comprises 100 parts by weight of a base rubber, 13 to 28 parts by weight of an α,β-unsaturated carboxylic acid metallic salt, 0.5 to 3 parts by weight of a crosslinking initiator and 4 to 136 parts by weight of a filler.

4. The three-piece solid golf ball according to claim 3 wherein said base rubber is a butadiene rubber having not less than 85% of 1,4-structure.

5. The three-piece solid golf ball according to claim 3 wherein said α,β-unsaturated carboxylic acid metallic salt is zinc acrylate or zinc methacrylate.

6. The three-piece solid golf ball according to claim 3 wherein said crosslinking initiator is an organic peroxide.

7. The three-piece solid golf ball according to claim 6 wherein said organic peroxide is dicumyl peroxide.

8. The three-piece solid golf ball according to claim 1 wherein said outer shell 1b is formed by molding a rubber composition which comprises 100 parts by weight of a base rubber, 28 to 35 parts by weight of an α,β-unsaturated carboxylic acid metallic salt, 0.5 to 3 parts by weight of a crosslinking initiator and 1 to 106 parts by weight of a filler.

9. The three-piece solid golf ball according to claim 8 wherein said base rubber is a butadiene rubber having not less than 85% of 1,4-structure.

10. The three-piece solid golf ball according to claim 8 wherein said α,β-unsaturated carboxylic acid metallic salt is zinc acrylate or zinc methacrylate.

11. The three-piece solid golf ball according to claim 8 wherein said crosslinking initiator is an organic peroxide.

12. The three-piece solid golf ball according to claim 11 wherein said organic peroxide is dicumyl peroxide.

*13. The three-piece solid golf ball according to claim 1, wherein the content of α, β-unsaturated carboxylic acid metallic salt in the center 1a is smaller than the content of α, β-unsaturated carboxylic acid metallic salt in the outer shell 1b and the center 1a is softer than the outer shell 1b.*

*14. The three-piece solid golf ball according to claim 1, wherein a compression deformation amount of the core 1 is 2.7 to 5.0 mm.*

* * * * *